(12) United States Patent
Bischoff et al.

(10) Patent No.: US 10,864,897 B2
(45) Date of Patent: Dec. 15, 2020

(54) BRAKE DEVICE FOR A HYDRAULIC MOTOR VEHICLE BRAKE SYSTEM

(71) Applicant: Continental Teves AG & Co. oHG, Frankfurt am Main (DE)

(72) Inventors: Andreas Bischoff, Frankfurt am Main (DE); Jefferson Colasanta, Hofheim am Taunus (DE); Marc Ibanez, Frankfurt am Main (DE); Manfred Rüffer, Sulzbach (DE); Thomas Sellinger, Dreieich (DE)

(73) Assignee: Continental Teves AG & Co. oHG, Frankfurt am Main (DE)

( * ) Notice: Subject to any disclaimer, the term of this patent is extended or adjusted under 35 U.S.C. 154(b) by 10 days.

(21) Appl. No.: 16/335,432

(22) PCT Filed: Aug. 16, 2017

(86) PCT No.: PCT/EP2017/070755
§ 371 (c)(1),
(2) Date: Mar. 21, 2019

(87) PCT Pub. No.: WO2018/054619
PCT Pub. Date: Mar. 29, 2018

(65) Prior Publication Data
US 2020/0017091 A1    Jan. 16, 2020

(30) Foreign Application Priority Data
Sep. 26, 2016    (DE) .................. 10 2016 218 421

(51) Int. Cl.
*B60T 11/18*    (2006.01)
*F15B 15/22*    (2006.01)
*B60T 11/16*    (2006.01)

(52) U.S. Cl.
CPC ............. *B60T 11/18* (2013.01); *B60T 11/165* (2013.01); *F15B 15/226* (2013.01)

(58) Field of Classification Search
CPC ....... B60T 11/18; B60T 11/165; B60T 15/226
See application file for complete search history.

(56) References Cited

U.S. PATENT DOCUMENTS

2002/0116924 A1 * 8/2002 Winkelmann ........ F16D 25/088
60/533
2003/0188632 A1   10/2003 Friedsam et al.
(Continued)

FOREIGN PATENT DOCUMENTS

DE    19610834 C1    6/1997
DE    10346674 A1    1/2005
(Continued)

OTHER PUBLICATIONS

German Search Report for German Application No. 10 2016 218 421.0, dated Jul. 25, 2017—9 pages.
(Continued)

*Primary Examiner* — Thomas E Lazo
*Assistant Examiner* — Daniel S Collins
(74) *Attorney, Agent, or Firm* — RatnerPrestia

(57) ABSTRACT

A brake device for a hydraulic motor vehicle brake system without a vacuum booster, with a housing with at least one pressure chamber arranged therein, with a cylinder piston which can be axially moved in an actuation direction by an actuating rod unit coupled to the cylinder piston in order to generate brake pressure, wherein a rigid stop is provided for the cylinder piston which defines the non-actuated starting position of the cylinder piston. In order to provide an improved brake device of the above-mentioned type, which permits simple and reliable detection of the zero point and simultaneously has reduced noise emission on the return, a
(Continued)

damping element is provided which permits a mechanical decoupling of the actuating rod unit from the cylinder piston in a release direction opposite the actuation direction by reversible deformation.

9 Claims, 2 Drawing Sheets

(56) References Cited

U.S. PATENT DOCUMENTS

| | | |
|---|---|---|
| 2008/0258545 A1 | 10/2008 | Drumm |
| 2011/0297493 A1 | 12/2011 | Vollert et al. |
| 2011/0315008 A1 | 12/2011 | Isakson |
| 2012/0192556 A1* | 8/2012 | Verhagen ............... B60T 8/4072 60/585 |
| 2015/0000266 A1 | 1/2015 | Murayama et al. |

FOREIGN PATENT DOCUMENTS

| | | |
|---|---|---|
| DE | 102009047263 A1 | 6/2010 |
| DE | 102011086527 A1 | 5/2012 |
| DE | 102014212361 A1 | 12/2014 |
| JP | 0334983 U | 4/1991 |
| KR | 20030045161 A | 6/2003 |
| KR | 20120138068 A | 12/2012 |
| WO | 2006042822 A1 | 4/2006 |
| WO | 2015189061 A1 | 12/2015 |

OTHER PUBLICATIONS

International Search Report and Written Opinion for International Application No. PCT/EP2017/070755, dated Nov. 7, 2017—7 pages.
Korean Notice of Grounds for Rejection for Korean Application 10-2019-7008605 dated Feb. 14, 2020, with translation, 12 pages.
Notice of Reasons for Refusal for Japanese Application No. 2019-516189, dated Feb. 28, 2020, with translation, 6 pages.

* cited by examiner

BRAKE DEVICE FOR A HYDRAULIC MOTOR VEHICLE BRAKE SYSTEM

CROSS REFERENCE TO RELATED APPLICATIONS

This application is the U.S. National Phase Application of PCT International Application No. PCT/EP2017/070755, filed Aug. 16, 2017, which claims priority to German Patent Application No. 10 2016 218 421.0, filed Sep. 26, 2016, the contents of such applications being incorporated by reference herein.

FIELD OF THE INVENTION

The invention relates to a brake device for a hydraulic motor vehicle brake system.

BACKGROUND OF THE INVENTION

The widely used conventional brake devices with a vacuum booster have, because of their design, a very high inherent damping which amongst others leads to a characteristically "soft" feel at the brake pedal with limited pedal release rate or return speed and a quiet stop, and as such have become established in the market and hence desirable.

Due to increasing automation of vehicle control systems including braking control systems, but also the desire to save installation space, externally actuated brake devices with significantly smaller electrohydraulic, electromechanical and other such booster stages are becoming increasingly widely used.

For reliable actuation, calibration and travel detection of the driver's request, externally actuated brake devices require knowledge of the precise relative position of a cylinder piston—which builds up brake pressure—in its non-actuated starting position known as the zero or reference point.

In order to avoid the cost of complex sensor systems and physical calibration, it is known to provide a fixed mechanical stop for the cylinder piston which defines said zero point and serves as a measurement origin for the electronic control systems.

In comparison with a conventional brake device however, devices without vacuum booster have less inherent damping because of the design. This means that, for example on rapid release of the brake pedal after braking, the cylinder piston and solid mechanical actuation components coupled thereto—such as for example the actuation rod and brake pedal—have too high a return speed, whereby when they hit the mechanical stop, a stop noise is produced which may be considered irritating.

SUMMARY OF THE INVENTION

An aspect of the invention is an improved brake device without vacuum booster, which allows simple and reliable detection of the zero point and at the same time emits less sound on its return.

An aspect of the invention proposes that a damping element is provided which permits a mechanical decoupling of the actuating rod unit from the cylinder piston, in a release direction opposite the actuation direction, by means of a reversible deformation.

In this way, a defined overtravel of the pedal after the actual piston stop is permitted on rapid return, without the entire return energy having to be absorbed abruptly by a noisy, hard mechanical stop.

According to a preferred refinement, the damping element may be arranged positionally securely and compactly in the cylinder piston, and be mechanically protected.

For the purpose of easier handling and cost-effective production, a preferred embodiment according to the invention provides that the damping element is formed as a solid element which is elastically deformable at least in the axial direction.

According to a particularly preferred refinement, the damping element may be formed from an elastomer material, whereby a particularly high proportion of the introduced forces is transformed into heat and at the same time less stringent dimensional tolerances are required.

Within the scope of an aspect of the invention however, other—in particular metallic—mechanical damping and springing elements may be used, such as for example cup springs, ring springs, leaf springs and similar.

An aspect of the invention furthermore proposes that the actuating rod unit is received in the cylinder piston so as to be axially limitedly movable relative to the cylinder piston in the release direction, provoking deformation of the damping element.

In this way, on its return, the actuating rod unit may perform the relative movement to dissipate energy compactly in the cylinder piston.

In a preferred embodiment according to an aspect of the invention, the actuating rod unit is constructed from at least two pieces with an actuating rod and a fitting piece which is arranged so as to be tiltable but immovable on the cylinder piston-side end of the actuating rod, wherein a front face is formed on the fitting piece for introducing actuation forces into the cylinder piston in the actuation direction, and a rear face for introducing inertia forces from the actuating rod into the damping element in the release direction.

It is furthermore proposed that the damping element is used to positionally secure the fitting piece in the cylinder piston, whereby the number of components and the space required may be kept small, and also the force flow is improved and tolerance chains largely reduced.

According to a first embodiment according to an aspect of the invention, the damping element is axially positioned and secured by a removable locking element, such as for example a locking ring, round wire circlip or similar, whereby a repair-friendly solution can be implemented with simplified installation and without complex tools and special jigs.

A particularly simple solution with efficient production is proposed according to the invention if the cylinder piston contains a radially inner groove for receiving the locking element. Thus the axial position of the fitting piece clamped in the cylinder piston and of the damping element is necessarily, unambiguously and simultaneously established by installation, and mounting errors are reduced.

According to a second embodiment of an aspect of the invention, the damping element may however be positionally secured by plastic deformation of the region of the cylinder piston, such as by caulking, constricting, clinching and similar.

This allows a particularly stable solution with very high safety reserves.

BRIEF DESCRIPTION OF THE DRAWINGS

Further features and advantages of aspects of the invention will emerge from the following description of an exemplary embodiment. In the appended drawings.

DETAILED DESCRIPTION OF THE PREFERRED EMBODIMENTS

FIG. 1

Figure 1:
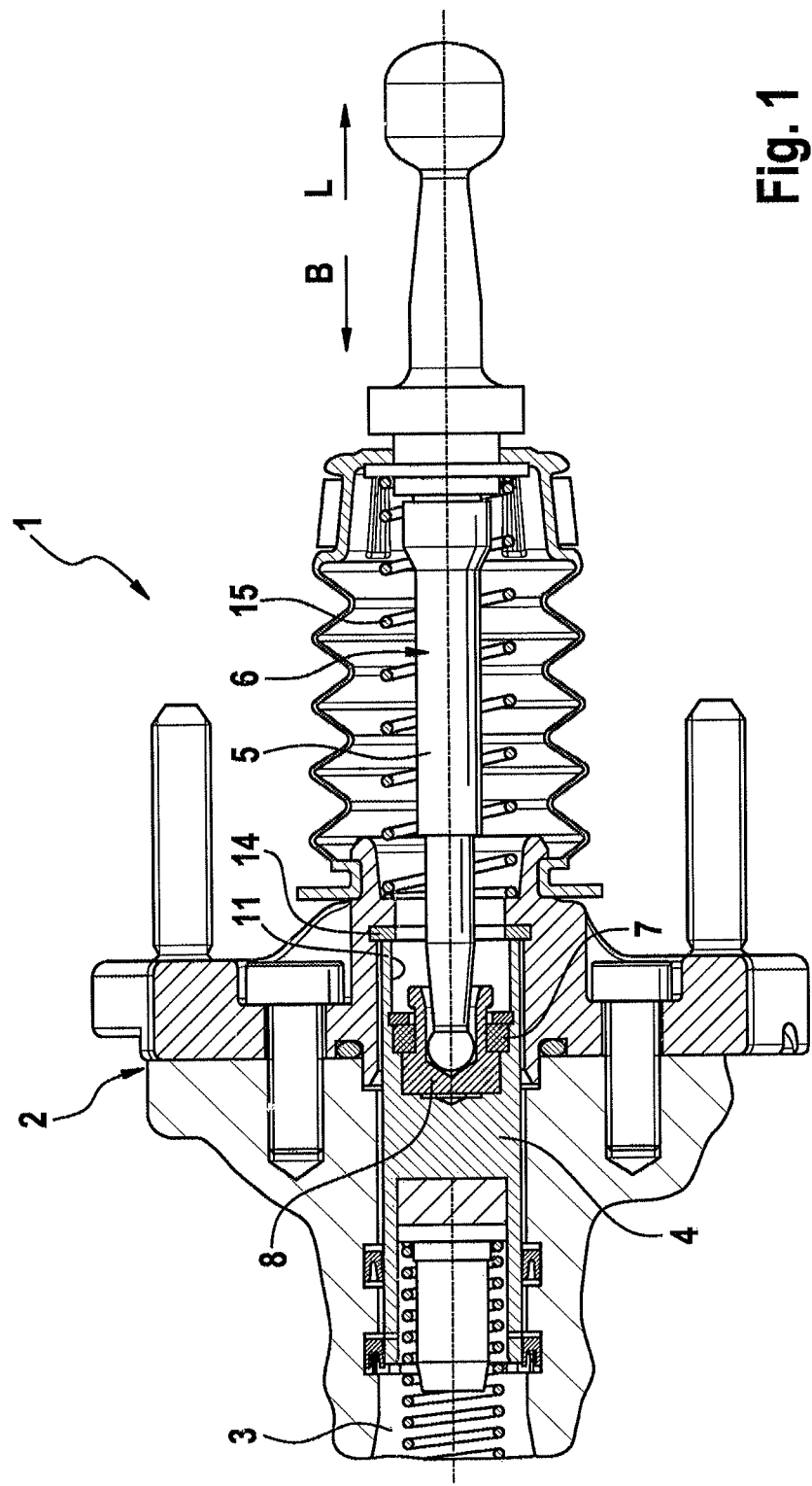
FIG. 1 shows in longitudinal section a partial view of a first embodiment of the improved brake device according to an aspect of the invention.

The brake device 1 according to an aspect of the invention has a multipiece housing 2 containing a pressure chamber 3 which is filled with a brake fluid. The pressure chamber 3 is here connected hydraulically (not shown) to a simulator or to at least one wheel brake for generating brake pressure.

On one side, the pressure chamber 3 is delimited by a cylinder piston 4 which may be axially displaced in the actuation direction B by means of an actuating rod unit 6.

The cylinder piston 4 is here shown in its non-actuated starting position in which it lies against a rigid stop 14 fixed to the housing. The stop 14 thus always defines the non-actuated starting position or zero position of the cylinder piston 4.

The actuating rod unit 6 is coupled to a brake pedal (not shown here). When the cylinder piston 4 is actuated by means of the brake pedal or actuating rod unit 6, a return spring 15 clamped between the actuating rod 5 and the housing 2 is compressed; after release of the brakes, said spring supports the return of the mechanical components in the release direction L into their respective non-actuated starting positions.

After the end of the braking process and after release of the brake—for example, by the driver lifting their foot off the brake pedal—the cylinder piston 4, together with the actuating rod unit 6 and the brake pedal, is moved quickly in the release direction L due to the spring and hydraulic forces acting thereon, until the back edge of the cylinder piston 4 hits the stop 14.

The moved masses of the actuating rod unit 6 and brake pedal coupled thereto lead to the build-up of inertia forces which are transferred to the cylinder piston 4 on the sudden stoppage of the cylinder piston 4 when it hits the stop 14.

A damping element 7, which can be reversibly deformed under build-up of a preload force and only deforms in the axial direction when the cylinder piston 4 hits on the stop 14, is connected between the actuating rod unit 6 and the cylinder piston 4, in the force flow from the actuating rod unit 6 into the cylinder piston 4 in the release direction L. In this way, the actuating rod unit 6 is temporarily decoupled from the cylinder piston 4, and moves relative thereto slightly further in the release direction L while the cylinder piston 4 remains in its zero position. After dissipation of the surplus energy, the actuating rod unit 6, driven by the preload force built up in the damping element 7, moves in the actuation direction B into its non-actuated starting position shown.

Due to the deformation of the damping element 7, the forces introduced therein are partially converted into heat and only a reduced proportion is passed on to the cylinder piston 4 and housing 2. In this way, the total impact energy acting on the stop 14 and the resulting sound emissions are reduced. The stop noise is reduced.

In the embodiment shown, the damping element 7 is formed as an elastomer ring element which is positionally secured in the cylinder piston 4. The scope of an aspect of the invention also includes other reversibly deformable components, such as for example metal spring elements.

FIG. 2

Figure 2:
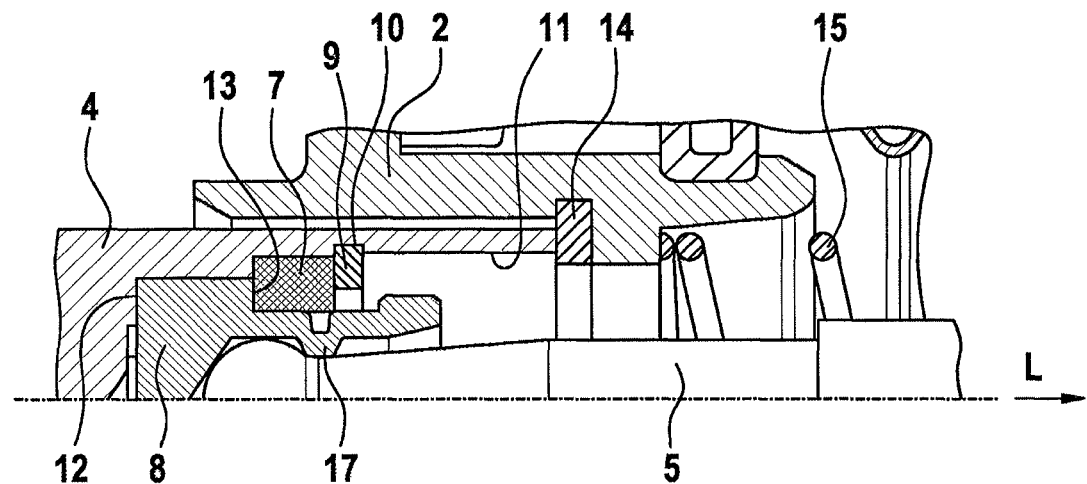
FIG. 2 shows an enlarged view of the region of the embodiment in FIG. 1 with the damping element.

FIG. 2 shows in enlarged scale the region around the damping element 7 of the embodiment according to an aspect of the invention shown in FIG. 1.

The actuating rod unit 6 is formed of multiple pieces in the embodiment shown. It comprises a substantially pin-like actuating rod 5 and a fitting piece 8 fixed to its end on the cylinder piston side, and substantially serves to optimise the force transmission from the actuating rod 5 to the cylinder piston 4, and at the same time allows angular compensation of the actuating rod 5. In the embodiment shown, the fitting piece 8 is connected to the actuating rod 5 by caulking, in the form of several indentations 17 distributed peripherally behind the ball-like head of said actuating rod 5, whereby it is fixed thereto in a tiltable and axially immobile fashion.

The fitting piece 8 is inserted in a stepped bore 11 formed in the cylinder piston 4, and rests against the damping element 7 in the release direction L. The damping element 7 is also arranged inside the stepped bore 11 in the cylinder piston 4 and axially positionally secured in the release direction L by means of a locking element 9. Thus the fitting piece 8 is captively held in the cylinder piston 4 in a force-transmitting connection by the damping element 7.

In the embodiment shown, the locking element 9 is formed as a locking ring inserted in a radially inner groove 10, and because of this design can be both installed and removed.

To introduce actuation forces into the cylinder piston 4 in the actuation direction B, a flat disc-like front face 12 is provided on the fitting piece 8. An annular back face 13 serves to transfer forces from the actuating rod 5 into the damping element 7 in the release direction L.

FIG. 3

Figure 3:
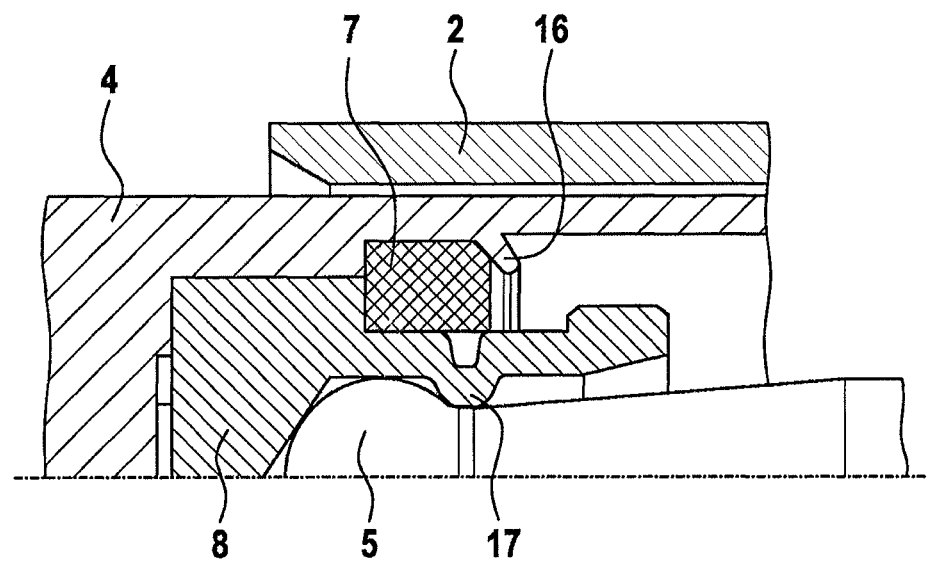
FIG. 3 shows an enlarged view of the region with the damping element of another embodiment according to an aspect of the invention.

FIG. 3 shows another embodiment of the brake device 1 according to an aspect of the invention. In contrast to the embodiment described above, the damping element 7 and hence also the fitting piece 8 are axially fixed in the cylinder piston 4 not by a removable locking element 9 but by a plastically deformed region 16 of the cylinder piston 4.

LIST OF REFERENCE SIGNS

1 Brake device
2 Housing
3 Pressure chamber
4 Cylinder piston
5 Actuating rod
6 Actuating rod unit
7 Damper element
8 Fitting piece
9 Locking element
10 Radially inner groove
11 Stepped bore
12 Front face
13 Rear face
14 Stop
15 Return spring
16 Region
17 Indentation
B Actuation direction
L Release direction

The invention claimed is:

1. A brake device for a hydraulic motor vehicle brake system without a vacuum booster, comprising:

a housing with at least one pressure chamber arranged therein, with a cylinder piston which can be axially moved in an actuation direction by an actuating rod unit coupled to the cylinder piston, wherein a rigid stop is provided for the cylinder piston which defines the non-actuated starting position of the cylinder piston, and, a damping element which permits a mechanical decoupling of the actuating rod unit from the cylinder piston in a release direction opposite the actuation direction by a reversible deformation, wherein the actuating rod unit is constructed from at least two pieces with an actuating rod and a fitting piece which is arranged in a tiltable but immovable fashion on an end of the actuating rod on the cylinder piston side, wherein a front face is formed on the fitting piece for introducing actuation forces into the cylinder piston in the actuation direction, and a rear face for introducing forces from the actuating rod into the damping element in the release direction.

2. The brake device as claimed in claim 1, wherein the damping element is positionally secured in the cylinder piston.

3. The brake device as claimed in claim 1, wherein the damping element is configured as a solid element which is elastically deformable at least in the axial direction.

4. The brake device as claimed in claim 1, wherein the actuating rod unit is received in the cylinder piston so as to be axially limitedly movable relative to the cylinder piston in the release direction, provoking deformation of the damping element.

5. The brake device as claimed in claim 2, wherein the damping element is positionally secured by a removable locking element.

6. A brake device for a hydraulic motor vehicle brake system without a vacuum booster, comprising:

a housing with at least one pressure chamber arranged therein, with a cylinder piston which can be axially moved in an actuation direction by an actuating rod unit coupled to the cylinder piston, wherein a rigid stop is provided for the cylinder piston which defines the non-actuated starting position of the cylinder piston, and, a damping element which permits a mechanical decoupling of the actuating rod unit from the cylinder piston in a release direction opposite the actuation direction by a reversible deformation, and wherein the damping element is positionally secured in the cylinder piston by plastic deformation of a region of the cylinder piston.

7. The brake device as claimed in claim 1, wherein the damping element is used to positionally secure the fitting piece in the cylinder piston.

8. The brake device as claimed in claim 3, wherein the damping element is made from an elastomer material.

9. A brake device for a hydraulic motor vehicle brake system without a vacuum booster, comprising:

a housing with at least one pressure chamber arranged therein, with a cylinder piston which can be axially moved in an actuation direction by an actuating rod unit coupled to the cylinder piston, wherein a rigid stop is provided for the cylinder piston which defines the non-actuated starting position of the cylinder piston, and, a damping element which permits a mechanical decoupling of the actuating rod unit from the cylinder piston in a release direction opposite the actuation direction by a reversible deformation, wherein the damping element is positionally secured in the cylinder piston by a removable locking element, and wherein a radially inner groove is formed in the cylinder piston for receiving the locking element.

\* \* \* \* \*